(12) United States Patent
Bech et al.

(10) Patent No.: US 7,936,080 B2
(45) Date of Patent: May 3, 2011

(54) WIND TURBINE, A METHOD FOR COUPLING A FIRST DRIVE TRAIN COMPONENT OF THE DRIVE TRAIN OF A WIND TURBINE TO A SECOND DRIVE TRAIN COMPONENT OF THE DRIVE TRAIN AND USE OF A WIND TURBINE

(75) Inventors: Anton Bech, Ringkøbing (DK); Jens Demtröder, Rønde (DK); Keld Lyager Jensen, Skjern (DK)

(73) Assignee: Vestas Wind Systems A/S (DK)

( * ) Notice: Subject to any disclaimer, the term of this patent is extended or adjusted under 35 U.S.C. 154(b) by 0 days.

(21) Appl. No.: 12/766,404

(22) Filed: Apr. 23, 2010

(65) Prior Publication Data

US 2010/0201128 A1   Aug. 12, 2010

Related U.S. Application Data

(63) Continuation of application No. PCT/DK2008/000371, filed on Oct. 22, 2008.

(30) Foreign Application Priority Data

Oct. 23, 2007   (DK) ................................ 2007 01526

(51) Int. Cl.
*F03D 7/04* (2006.01)
(52) U.S. Cl. ............................................. 290/55; 416/1
(58) Field of Classification Search .................... 290/43, 290/44, 54, 55; 416/1, 500
See application file for complete search history.

(56) References Cited

U.S. PATENT DOCUMENTS

| 2,643,749 | A | 1/1953 | Greenlee |
| 4,893,960 | A | 1/1990 | Beier et al. |
| 7,160,083 | B2 * | 1/2007 | Pierce et al. .................... 416/61 |
| 7,431,567 | B1 * | 10/2008 | Bevington et al. ........ 416/244 R |
| 7,815,536 | B2 * | 10/2010 | Jansen et al. .................. 475/159 |
| 7,854,589 | B2 * | 12/2010 | Nielsen et al. .................... 416/1 |
| 2007/0003321 | A1 | 1/2007 | Hara et al. |

FOREIGN PATENT DOCUMENTS

| DE | 4414384 A1 | 10/1994 |
| EP | 1445484 A1 | 8/2004 |
| EP | 1975405 A2 | 10/2008 |
| FR | 2649165 A1 | 1/1991 |
| GB | 824931 | 12/1959 |
| GB | 2252394 A | 8/1992 |
| JP | 2007064200 A | 3/2007 |

OTHER PUBLICATIONS

Danish Search Report; PA 2007 01526; May 6, 2008; 1 page.

(Continued)

*Primary Examiner* — Nicholas Ponomarenko
(74) *Attorney, Agent, or Firm* — St. Onge Steward Johnston & Reens LLC

(57) ABSTRACT

A wind turbine including a drive train. The drive train includes at least a rotor for transforming wind into rotation of a rotor hub, to provide a drive torque, a generator for transforming at least a part of the drive torque into electrical power, and at least one coupling for connecting a first drive train component to a second drive train component for transferring the drive torque between the components. The coupling includes a first coupling part with a first coupling area, the first coupling area being connected with a second coupling area of a second coupling part, whereby the drive torque is transferred from one of the areas to the other of the areas during operation of the coupling.

20 Claims, 6 Drawing Sheets

OTHER PUBLICATIONS

International Search Report and Written Opinion of the International Searching Authority; PCT/DK2008/000371; Sep. 23, 2009; 14 pages.

"Guidelines for Design of Wind Turbines"; 2nd Edition, Det Norske Veritas; Copenhagen and Wind Energy Department, Risø National Laboratory; 2002; ISBN 87-550-2870-5; 294 pages.

* cited by examiner

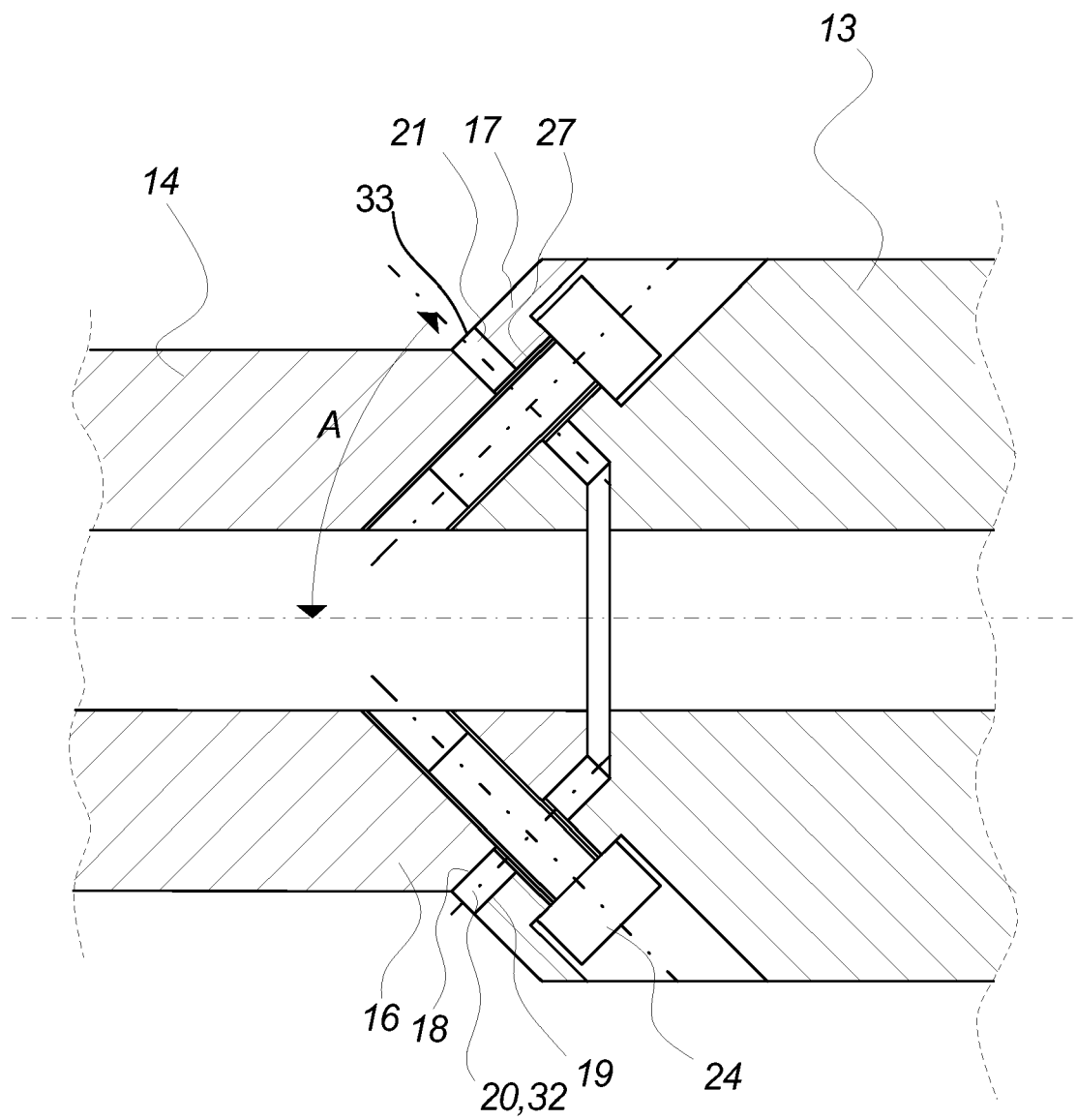
*Fig. 8*
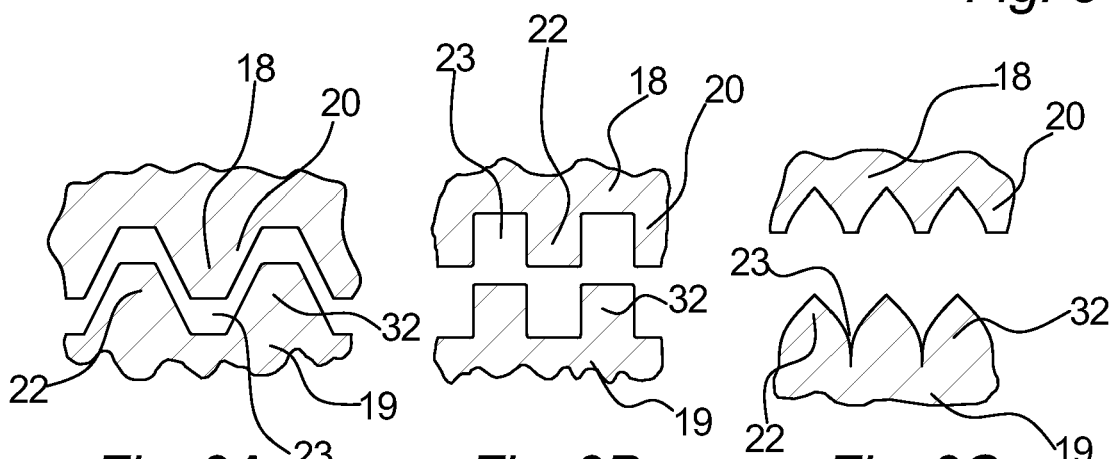
*Fig. 9A*  *Fig. 9B*  *Fig. 9C*

WIND TURBINE, A METHOD FOR COUPLING A FIRST DRIVE TRAIN COMPONENT OF THE DRIVE TRAIN OF A WIND TURBINE TO A SECOND DRIVE TRAIN COMPONENT OF THE DRIVE TRAIN AND USE OF A WIND TURBINE

CROSS-REFERENCE TO RELATED APPLICATIONS

The present application is a continuation of pending International patent application PCT/DK2008/000371 filed on Oct. 22, 2008 which designates the United States and claims priority from Danish patent application PA 2007 01526 filed on Oct. 23, 2007, the content of which is incorporated herein by reference.

FIELD OF THE INVENTION

The invention relates to a wind turbine comprising a drive train with at least one coupling for connecting a first drive train component to a second drive train component, a method for coupling a first drive train component of the drive train of a wind turbine to a second drive train component of the drive train and use of a wind turbine.

BACKGROUND OF THE INVENTION

A wind turbine known in the art comprises a tapered wind turbine tower and a wind turbine nacelle positioned on top of the tower. A wind turbine rotor with a number of wind turbine blades is connected to the nacelle through a low speed shaft, which extends out of the nacelle front as illustrated on FIG. 1.

As large modern wind turbines gets bigger and bigger both in size and in power output the challenge of transferring the torque through the drive train of the wind turbine i.e. from the rotor to the generator becomes more pronounced.

The drive train typically comprises several interconnected drive train components such as the rotor, a main shaft, one or more gearboxes, a brake system, an overload protection system and a generator where the different drive train components are interconnected by means of some sort of detachable or dismountable coupling enabling that the torque can be transferred in and between the components and at the same time enabling that the individual drive train components can be dismounted and/or replaced.

A known way of providing a coupling in the drive train is to use a so-called shrink-disk. The shrink-disc functions by converting locking screw clamp loads into radial contact pressures applied to the shafts of the mounted components, in effect "shrinking" it onto the shafts. Ideally this type of coupling will result in a zero-backlash mechanical interference fit, however wide friction joints (as required for large torque transfer) are sensitive to shaft bending and rotating loads, which may cause micro-slip and subsequently fretting or fretting corrosion. Furthermore when the torque exceeds the capacity of the joint, the coupling may slip and locally weld together. Once this happens, the coupling is very hard to remove again and removal will typically destroy one or both of the joined shafts.

From European patent application EP 1 445 484 A1 it is also known to provide a wind turbine with a friction coupling which by means of bolts creates a clamping force on the radial extending surfaces of one or more discs. However this type of coupling is complex and difficult to dismount.

An object of the invention is therefore to provide the drive train of a wind turbine with an advantageous torque transferring coupling technique.

SUMMARY OF THE INVENTION

The invention provides for a wind turbine comprising a drive train. The drive train includes at least a rotor for transforming wind into rotation of a rotor hub, to provide a drive torque, a generator for transforming at least a part of the drive torque into electrical power, and at least one coupling for connecting a first drive train component to a second drive train component for transferring said drive torque between the components. The coupling comprises a first coupling part with a first coupling area, the first coupling area being connected with a second coupling area of a second coupling part, whereby the drive torque is transferred from one of the areas to the other of the areas during operation of said coupling, wherein the first coupling area is provided with a first positive engaging structure engaging a corresponding second positive engaging structure of the second coupling area, and wherein both the first and second positive engaging structures are extending inwardly from positions near or at an outer periphery of the first and second coupling parts, respectively.

It would be virtually impossible or at least very complex and expensive to make the wind turbine so that all the drive train components are maintained perfectly and rigidly aligned at all times during operation of the wind turbine. Especially because the loads transferred through the drive train of a wind turbine is particularly varying e.g. due to constantly changing wind direction, wind speed, wind shear over the rotor, meteorological conditions and corresponding constant changing of operation parameters such as teeter angle, pitch angle of the blades, yaw angle and of course because the rotor constantly rotates making any variation in the load transferred from the individual blades act as a rotating moment or radial force on at least some of the drive train components.

It is therefore advantageous that the coupling areas are provided with positive engaging structures which are mutually engaging in that it hereby is ensured that the large torque load is transferred at all times substantially without wearing the coupling.

In an aspect of the invention said first and second areas comprises axial means for transferring axial loads through said coupling at least in one direction.

By providing the coupling areas with axial load means for transferring axial loads through the coupling at least in one direction, it is ensured that if axial loads are to be transferred through the coupling, the areas are only pulled slightly apart or pressed more firmly together or both at different areas of the coupling areas. This is advantageous in that even though this design theoretically allows for axial movement in the coupling, the coupling can handle this substantially without wearing and because the coupling areas comprise positive engaging structures engaging with each other, the torque transferring quality of the coupling is substantially not affected of the axial loads even if this is accompanied by a rotating radial load.

In an aspect of the invention said axial means is provided by establishing said areas so that they are non-parallel with the axis of rotation of said coupling.

If the coupling areas are parallel with the axis of rotation of the coupling, one of the areas will have to fit into the other, like e.g. a traditional key and slot shaft connection, a six-spline socket connection or a shrink-disc coupling. But these coupling or connection types are relatively poor at transferring axial loads and they are particularly prone to wear when exposed to rotating loads from shaft bending or imbalanced loads through the bearing.

As soon as the coupling areas are not parallel with the axis of rotation of the coupling, the coupling is provided with axial means capable of transferring axial loads at least in one direction and it is hereby enabled that if the coupling is affected by a rotating load, the imbalanced loads can be transferred trough the coupling substantially without wearing it.

In an aspect of the invention said areas are established in a face angle of between 45° and 135°, preferably between 80° and 100° such as 90° in relation to the axis of rotation of said coupling to establish said axial means.

If the face angle gets below 45° or above 135° the coupling areas will have a tendency to wedge when exposed to an axial load e.g. from the torque transferring parts or from fixation means maintaining the coupling areas in close contact, which in worst case could make it virtually impossible to disassemble the coupling. However as long as the coupling areas are established within the present face angle range the coupling parts will not wedge and in this face angle range the coupling will furthermore enhance its self-aligning ability.

Positioning the areas in a face angle of substantially 90° in relation to the axis of rotation of the coupling is advantageous in that, it enables a much more simple manufacturing procedure hereby reducing cost and in that it reduces the need for axial displacement when assembling or dissembling the coupling, hereby simplifying the assembly procedure.

In an aspect of the invention said first and second positive engaging structure of said first and second coupling areas respectively are formed by alternating bulges and recesses.

Bulges—suitable for engaging a corresponding recess—e.g. in the form of teeth, pins, knobs or any other kind of protuberance of the face of the coupling areas will increase the coupling areas ability to transfer torque—particularly in relation to friction coupling or shrink couplings. When the bulges and recesses engage the risk of the coupling slipping is highly reduced whereby the durability of the coupling is increased without it affecting the couplings torque transferring quality or its ability to be dismantled.

In an aspect of the invention said positive engaging structure of said first and second coupling areas are formed as substantially radial extending teeth.

To transfer torque efficiently it is important that the positive engaging structure is established substantially transverse to the direction of rotation and it is therefore advantageous that the teeth extends radial.

Furthermore teeth is an efficient way of utilizing the coupling area in that teeth will ensure that the torque is transferred over a relatively large area hereby reducing local stress and the risk of micro slip.

Even further, teeth extending radially from the centre of the coupling in substantially all directions will further provide the coupling with the ability of handling radial loads in that at least some of the teeth will always lock the coupling towards radial movement no matter the direction of the radial load.

In an aspect of the invention said positive engaging structure of said first coupling area and/or said second coupling area is formed integrally in said area.

The positive engaging structure has to be able to transfer large torque loads to the coupling areas and by forming the positive engaging structure integrally in the areas any risk of slip and wear is eliminated.

In an aspect of the invention said first coupling part or said second coupling part is formed integrally in said first drive train component and said second drive train component.

Likewise, coupling parts has to be able to transfer large torque loads to the drive train components and by forming the coupling parts integrally in the drive train components any risk of slip and wear is eliminated. Furthermore, expensive and complex connections or couplings between the coupling parts and the drive train components can be avoided.

In an aspect of the invention at least one of said first drive train component and said second drive train component is selected from a group comprising: a drive train shaft, a main shaft, a main bearing, a coupling, a brake, a gearbox, a rotor hub and a generator.

Hereby is achieved an advantageous embodiment of the invention.

In an aspect of the invention said first drive train component or said second drive train component is a rotating shaft of said wind turbine gearbox such as a sun gear shaft or an input shaft of said gearbox.

The gearbox is properly the most complex mechanical unit in the wind turbine and it is therefore important that the gearbox or at least essential parts of the gearbox can be dismantled either in case of maintenance, repairs, replacement or simply to enable access. It is therefore particularly advantageous that the coupling according to the present invention is used for coupling torque transferring parts of the wind turbine gearbox.

Furthermore, the planet gears of the gearbox each only has to transfer parts of the total torque load and all gears or shafts after the sun gear will operate at increased rotational speed whereby the torque is reduced. The input shaft and the sun gear shaft is therefore the most strained torque transferring parts of the gearbox and it is therefore particularly advantageous to use a coupling according to the present invention for coupling a torque transferring part to the sun gear or the input shaft of the gearbox.

In an aspect of the invention said first or second coupling area of said rotating shaft defines an outer periphery of said drive train component.

Making the coupling area define the outer periphery of the drive train component is advantageous in that it enables a simpler mounting and dismantling of the drive train component and in that a large diameter coupling area is stronger towards torque.

In an aspect of the invention said first coupling area and said second coupling area comprises fixation means for substantially maintaining at least the axial position of said first coupling area in relation to said second coupling area at least during operation of said coupling.

At least to some degree a coupling of a wind turbine drive train will have to be able to handle axial loads either by absorbing them or by transferring them further down the drive train. By maintaining the mutual position of the coupling areas by means of fixation means it is ensured that the axial loads are transferred through the coupling substantially without affecting any part of the coupling particularly regarding wear.

In an aspect of the invention said fixation means are mechanical fixation means such as screws, bolts or rivets.

Mechanical fixation means are inexpensive and they are simple to mount and dismount and it is therefore advantageous to use these for fixating the coupling areas in relation to each other.

In an aspect of the invention at least one of said first drive train component and/or said second drive train component is hollow.

Thick-walled hollow shafts and solid shafts of the same outer diameter substantially have the same strength toward torque but hollow shafts can be made more flexible radial and they weigh less or a hollow shaft can be made almost equally stiff at significantly lower weight (the essence is a much better stiffness/weight ratio). A coupling according to the present invention allows for transferring of both axial loads and torque substantially without loads travelling through the centre of the coupling and since material is substantially not needed to transfer loads, it is advantageous to make the torque transferring parts hollow to save weight of the coupling and to ensure flexibility.

In an aspect of the invention said coupling further comprise radial load transferring means for transferring at least a part of a radial load between said first coupling part and said second coupling part and/or for mutually aligning said first coupling part and said second coupling part.

For certain coupling configurations the positive engaging structures does not enable that the coupling is self-centering and self-aligning and it is therefore advantageous to provide the coupling with radial load transferring means for transferring radial loads through the coupling substantially without straining the positive engaging structures.

In an aspect of the invention said coupling is self-centering and/or self-aligning because said first and second positive engaging structures are extending inwardly from positions near or at an outer periphery of the first and second coupling parts, respectively.

Because the positive engaging structures engage each other it is enabled that the coupling is self-centering/self-aligning, which means a tremendous advantage in the drive train of a wind turbine where the loads are constantly changing in size, direction and in number.

In an aspect of the invention said second coupling area of said second drive train component comprises a centre aperture through which said first drive train component can be mounted and dismantled.

Providing the second coupling area with a centre aperture is advantageous in that the first drive train component can be mounted and dismantled from the first drive train component side which would provide more free space to perform the process.

The invention further provides for a method for coupling a first drive train component of the drive train of a wind turbine to a second drive train component of the drive train. The method comprises the steps of providing the first drive train component with a first coupling part including a first coupling area and providing the second drive train component with a second coupling part including a second coupling area, and joining the first coupling part with the second coupling part by engaging a positive engaging structure of the first coupling area with a corresponding positive engaging structure of the second coupling area and so that the first coupling area and the second coupling area are capable of transferring axial loads through the coupling at least in one direction.

By arranging the coupling areas so that they can transfer axial loads at least in one direction, it is ensured that while the axial loads are transferred through the coupling the couplings ability to transfer torque is maintained or even improved due to the engaging positive engaging structures. This is advantageous in that it improves the couplings ability to transfer rotating loads, varying load and varying imbalanced loads, in that this method reduces the risk of slip and thereby wear.

In an aspect of the invention said method is a method for coupling drive train components in a wind turbine according to any of the above mentioned wind turbines.

Even further the invention provide for use of a wind turbine according to any of the above relating to wind turbines, wherein said wind turbine is a Megawatt wind turbine.

The larger the wind turbine is in power output the large the wind turbine or at least some of the wind turbine parts also has to be in physical size. Wind turbines with a rated power output above one Megawatt have to transfer so large torque loads through the drive train that traditional couplings becomes less effective or durable. Furthermore, with so large wind turbines an imbalanced load—or worse—a varying imbalanced load will have a great affect on the coupling because of the more flexible nature of the large drive train construction and it is therefore particularly advantageous to use a coupling according to the invention in a Megawatt wind turbine.

BRIEF DESCRIPTION OF THE DRAWINGS

The invention will be described in the following with reference to the figures in which FIG. 8 illustrates a cross section of a coupling comprising angled coupling areas, as seen from the side, and FIGS. 9A, 9B and 9C illustrates a cross section of three different embodiments of corresponding positive engaging structures, as seen from the side.

DETAILED DESCRIPTION OF THE INVENTION

Figure 1:
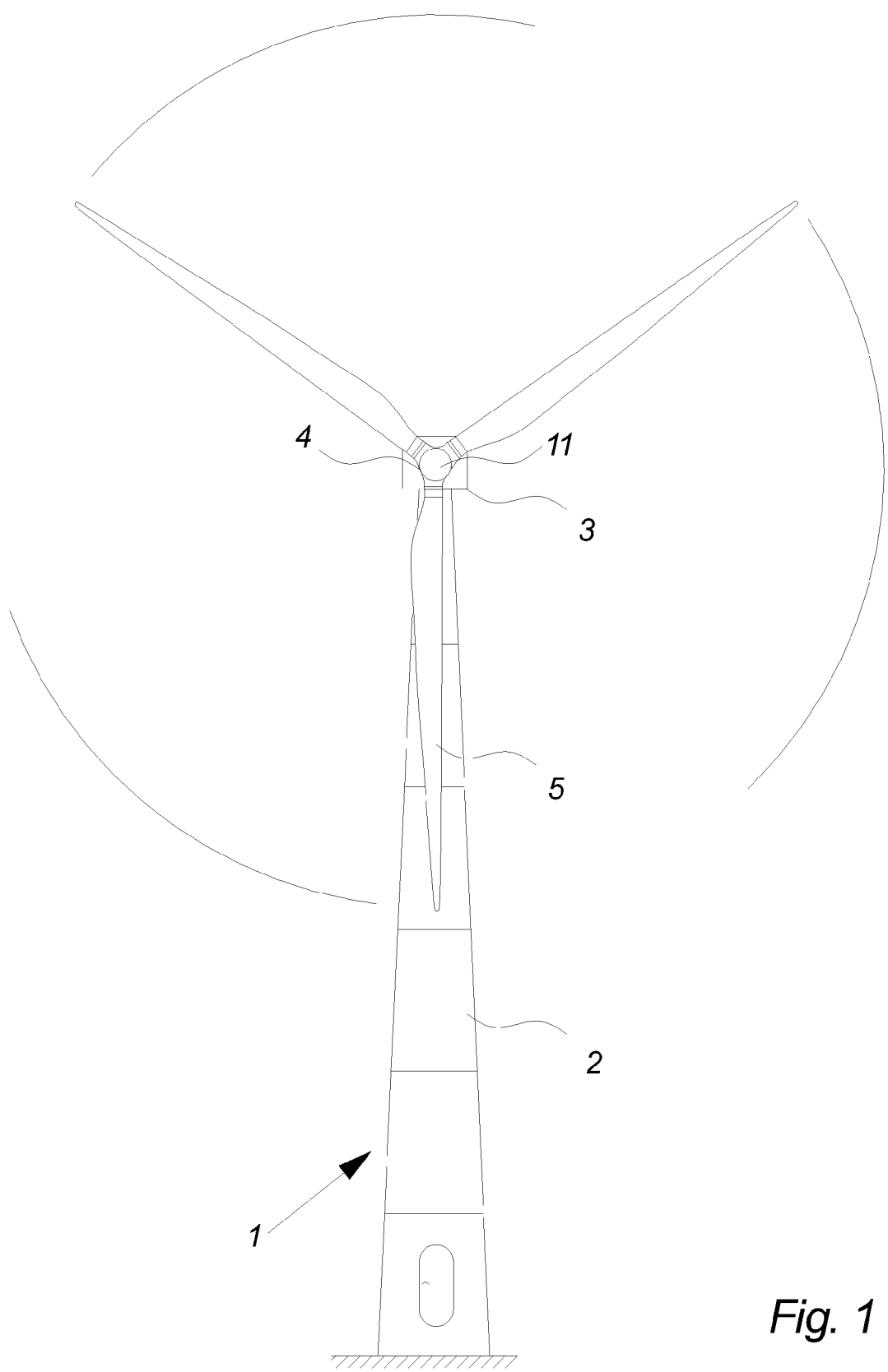
FIG. 1 illustrates a large modern wind turbine known in the art, as seen from the front.
Figure 2:
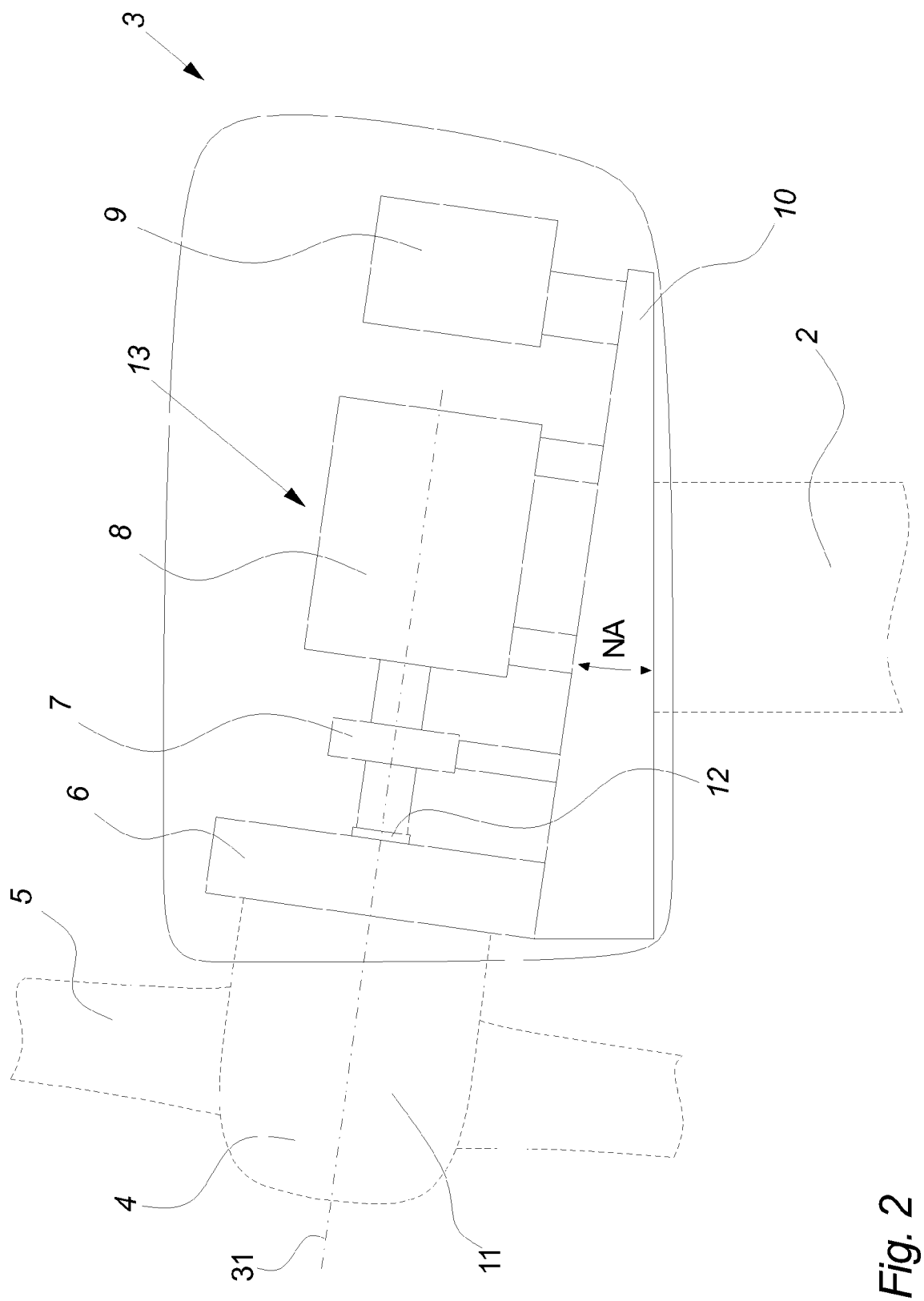
FIG. 2 illustrates a simplified cross section of a nacelle, as seen from the side.
Figure 3:
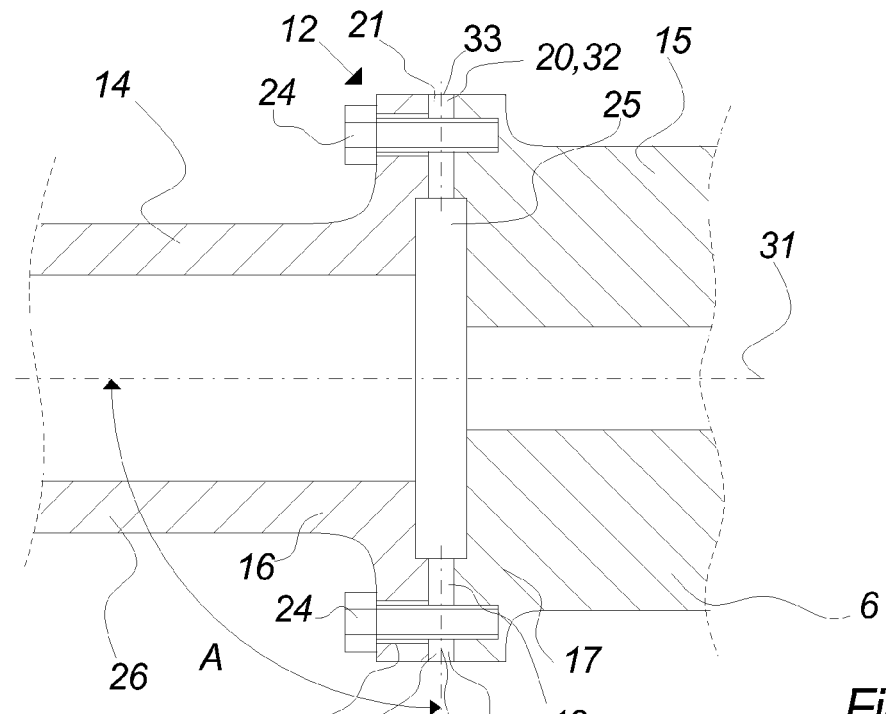
FIG. 3 illustrates a cross section of an embodiment of a coupling comprising external fixation means, as seen from the side.

FIG. 3 illustrates a cross section of an embodiment of a coupling 12 comprising external fixation means 24, as seen from the side.

In this embodiment of the invention the coupling 12 comprise a first coupling part 16 which is formed integrally in a first drive train component 14 which in this embodiment is the a shaft 26 for transferring torque from the rotor hub 11 to the input shaft of a wind turbine gearbox 6.

Likewise, the coupling 12 comprise a second coupling part 17 which is formed integrally in a second drive train component 15 which in this embodiment is the input shaft of a wind turbine gearbox 6.

As previously explained, in some wind turbine embodiments the rotor hub 11 is substantially directly connected to a ring gear, a planet carrier or other of a input shaft-less gearbox 6 and the first drive train component 14 could then be the output shaft of the gearbox 6 and the second drive train component 15 could be the generator 8 or in a further embodiment of the invention the first drive train component 14 or the second drive train component 15 could be a generator input shaft, an input or output shaft of a braking system 7, the main shaft 26, a output shaft of the hub 11 or any other torque transferring part of the wind turbine drive train 13.

It is also feasible that the present invention are used for arranging an intermediate flange between e.g. the turbine main shaft 26 and the gearbox input shaft, essentially disc that engages with identical toothings on both mates, for example a brake disc, a encoder flange or a rotor lock device. There may be only one bolt connection to hold all three members together.

In another embodiment of the invention one or both of the coupling parts 16, 17 could also be formed separately from the torque transferring parts 14, 15 e.g. if the coupling parts 16, 17 was attached to the torque transferring parts 14, 15 through a shrink joint, a bolted joint, a key joint, a pin joint or other or any combination hereof.

In this embodiment of the invention the first coupling part 16 comprise a first coupling area 18 formed integrally in the coupling part 16 and likewise the second coupling part 17 comprise a second coupling area 19 formed integrally in the coupling part 17.

In another embodiment of the invention the coupling areas 18, 19 could also be formed separately from the coupling parts 16, 17 e.g. if the coupling areas 18, 19 was attached to the coupling parts 16, 17 through a shrink joint, a bolted joint, a key joint, a pin joint or other or any combination hereof.

In this embodiment the first coupling area 18 comprise a first positive engaging structure 20 in the form of alternating bulges 22 and recesses 23 covering the entire first coupling area 18 and the second coupling area 18 comprise a corresponding second positive engaging structure 32 also in the form of alternating bulges 22 and recesses 23 covering the entire second coupling area 19.

In this embodiment of the invention both the first and second positive engaging structures 20, 32 are extending inwardly from positions at an outer periphery 33 of the first and second coupling parts 16,17, respectively.

In this embodiment of the invention the coupling 12 comprise axial means in form of the couplings areas 18, 19 being established substantially perpendicular to the axis of rotation 31 of the coupling 12 in that the face angle A of both couplings areas 18, 19 are 90° in relation to said axis of rotation 31. Hereby the coupling 12 is able to transfer axial forces from one coupling area 18, 19 to the other 18, 19.

In this embodiment of the invention the coupling 12 further comprise fixation means for maintaining the coupling areas 18, 19 engaged with each other at all times—hereby ensuring the torque transferring quality of the coupling 12—and to enable that the coupling 12 is able to transfer a axial load which would attempt to pull the coupling areas 18, 19 apart.

In this embodiment the fixation means 24 are bolts extending through fixation apertures 27 of the first coupling part 16 and engaging threaded fixation apertures 27 in the second coupling part 15 but in another embodiment the fixation means 24 could be clamps, screws, rivets or other and both parts 16, 17 could be threaded or non of the parts 16, 17 could comprise thread and the bolts or screws would then comprise nuts.

In this embodiment the fixation means 24 are a number of bolts arranged on a circle in the coupling areas 18, 19 but in another embodiment of the invention the fixation means 24 could be arranged on a circle outside the coupling areas 18, 19, centrally inside the coupling areas 18, 19, asymmetrically inside or outside the coupling areas 18, 19, the fixation means 24 may be one centrally arranged bolt/nut or any combination hereof. However it is preferred that the fixation means 24 is arranged at the neutral plane of bending.

In this embodiment of the invention the coupling 12 further comprise radial load transferring means 25 at least for assisting in aligning the two coupling parts 16, 17 and transferring radial loads through the coupling 12.

In this embodiment of the invention the radial load transferring means 25 is formed as a separate spigot engaging and guiding both parts 16, 17 but in another embodiment the radial load transferring means 25 could be formed integrally in one or the coupling parts 16, 17 and then engage the other part 16, 17 much like how the coupling areas 18, 19 engage.

Figure 4:
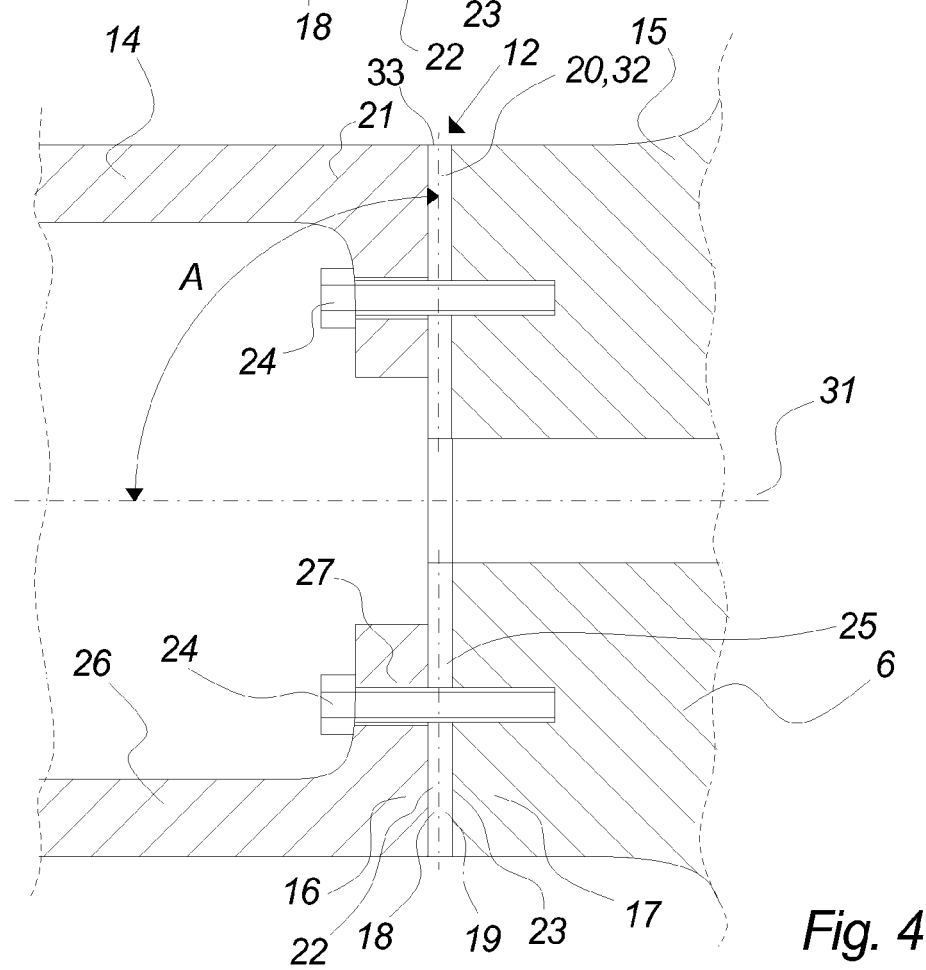
FIG. 4 illustrates a cross section of an embodiment of a coupling comprising internal fixation means, as seen from the side.

FIG. 4 illustrates a cross section of an embodiment of coupling 12 comprising internal fixation means 24, as seen from the side.

In this embodiment the bulges 22 and recesses 23 are constituted by substantially identical radial extending teeth formed in the surface of both the first coupling area 18 and the second coupling area 19. By displacing the top of the teeth of one of the coupling areas 18, 19 angularly, during joining, so that the top of the teeth on one area 18, 19 is placed between the tops of the teeth on the other area 18, 19 the teeth 20, 32 of the two areas 18, 19 will engage when brought together and as long as the areas 18, 19 are maintained in close contact the coupling 12 is capable of transferring large torque loads substantially backlash-free, which is highly advantageous for applications presenting a varying and reversing load such as wind turbines 1.

Since the forces applied by the fixation means for maintaining the alignment of the parts 16, 17 substantially are all in the axial direction of the coupling 12 and since substantially all other forces acting on the coupling 12 are torque or axial forces this coupling design enables that the coupling parts 16, 17 and the torque transferring parts 14, 15 can be hollow. This is a big advantage in that it hereby is possible to guide wires, conductors, hoses, pipes, rods or other through the centre or even to allow for personnel access through the centre of the coupling 12. Furthermore, the weight of the torque transferring parts 14, 15 can be reduced substantially without reducing their ability to transfer torque, and with relatively little effect on stiffness.

In this embodiment the fixation means 24 are arranged on the inside of the coupling 12 e.g. enabling that neighboring external bearings or other could be dismounted if the coupling was disengaged. In that In this embodiment of the invention the coupling 12 does not comprise separate radial load transferring means 25 in that the positive engaging structures 20, 32 of the coupling areas 18, 19 are formed to also act as radial load transferring means 25 as the positive engaging structures 20, 32 are designed to lock the two areas 18, 19 toward radial movement in all radial directions.

Incorporating the radial load transferring means 25 in the positive engaging structures 20, 32 of the coupling areas 18, 19 is advantageous in that no additional radial load transferring means surfaces or parts need be machined. Additional centering means may only be needed for very high radial loads, particularly for controlling the amount if displacement and relative motion of the toothed areas with respect to wear, fretting corrosion and adhesive wear.

Figure 5:
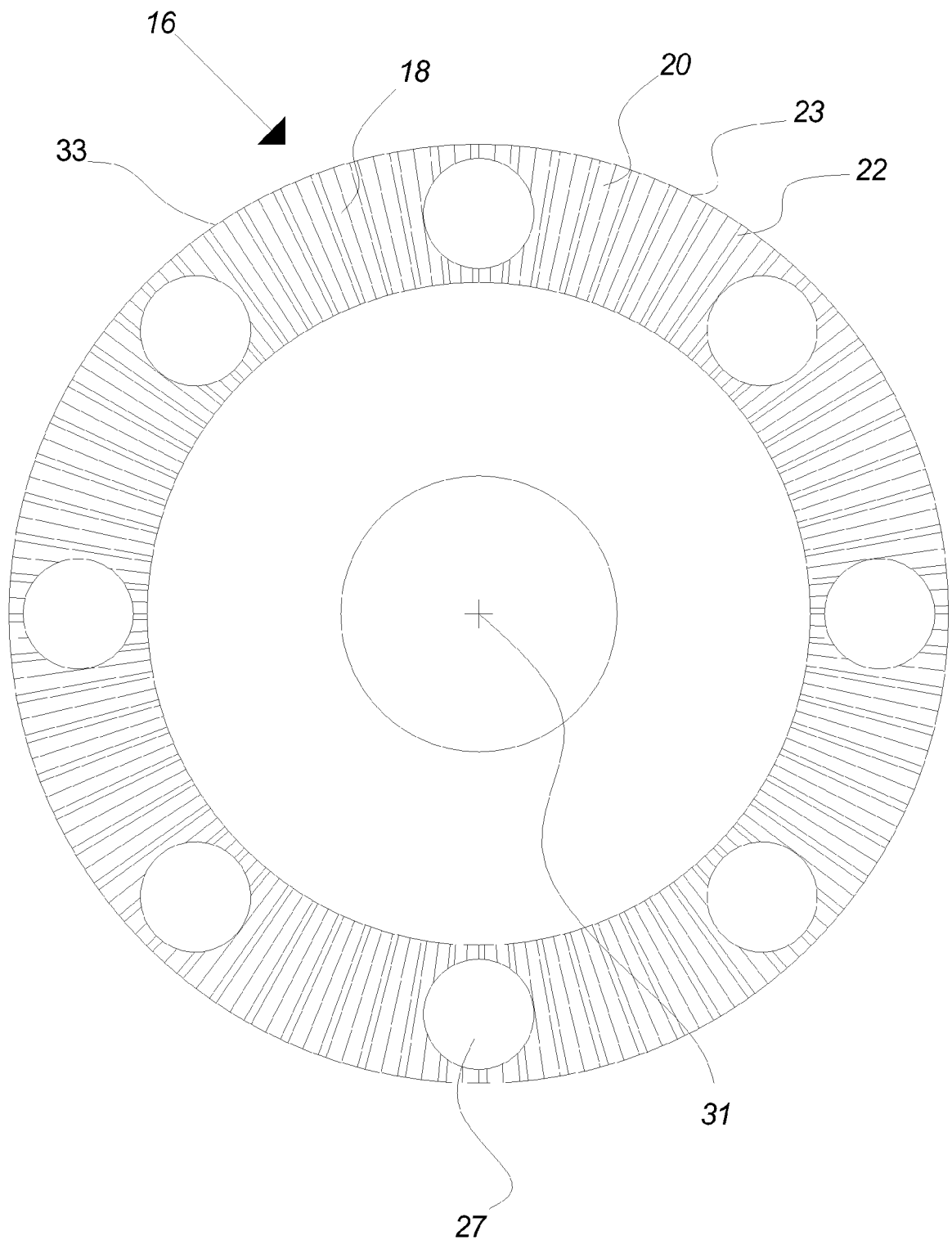
FIG. 5 illustrates an embodiment of a first coupling part, as seen in from the front.

FIG. 5 illustrates an embodiment of a first coupling part 16, as seen in from the front.

In this embodiment of the invention the first positive engaging structure 20 is formed by radial extending teeth formed in the surface of the coupling area 18. The contour lines of the teeth all cross the centre of rotation 31 making the teeth wider at the outer periphery 33 of the coupling area 18 that at the inner periphery of the coupling area 18.

The illustrated coupling part 16 would therefore be able to transfer radial loads when engaged with a corresponding second coupling part 17 in that the teeth's shape also would lock the coupling parts 16, 17 for mutual radial movement.

In this embodiment of the invention the coupling area 18 is provided with eight evenly spaced fixation apertures 27 for accommodating fixation means 24 which will force the coupling areas 18, 19 together. However, in another embodiment the coupling area 18 could be provided with another number of fixation apertures 27—either more or fewer—, the fixation apertures 27 could be located elsewhere on the coupling part 16 or the coupling part 16 could comprise no fixation apertures e.g. if the coupling areas 18, 19 was held together by means of clamps or the like.

Figure 6:
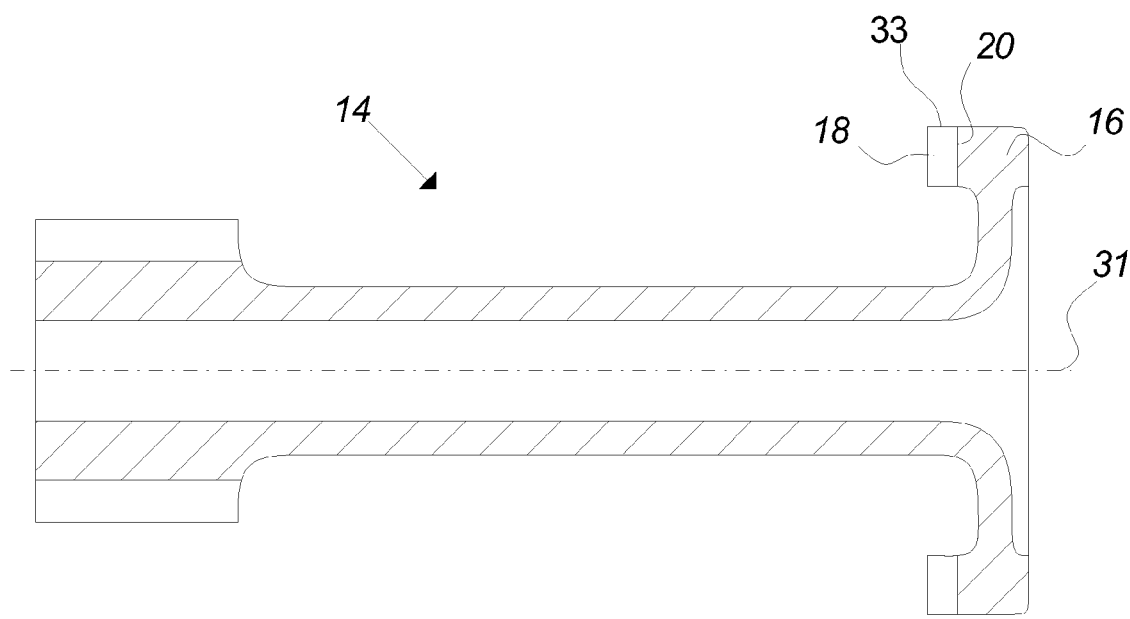
FIG. 6 illustrates a cross section of a gear wheel comprising a first coupling part, as seen from the side.

FIG. 6 illustrates a cross section of a gear wheel comprising a first coupling part 16, as seen from the side.

In this embodiment the gear wheel is a planet gear of an epicyclical wind turbine gearbox 6 but the gear wheel could just as well be a sun gear of a epicyclical wind turbine gearbox 6, a gear wheel of a wind turbine gear transmission stage or another type of gear wheel suitable for transferring large torque loads in the wind turbine gearbox 6.

In this embodiment the gear wheel is formed integrally with a long hollow shaft which ends up in a flange forming a first coupling part 16. On the side of the flange facing the gear wheel, the coupling part 16 is provided with a coupling area 18 provided with teeth formed transversely to the direction of rotation for engaging with the second coupling area 19 of another coupling part 17.

Figure 7:
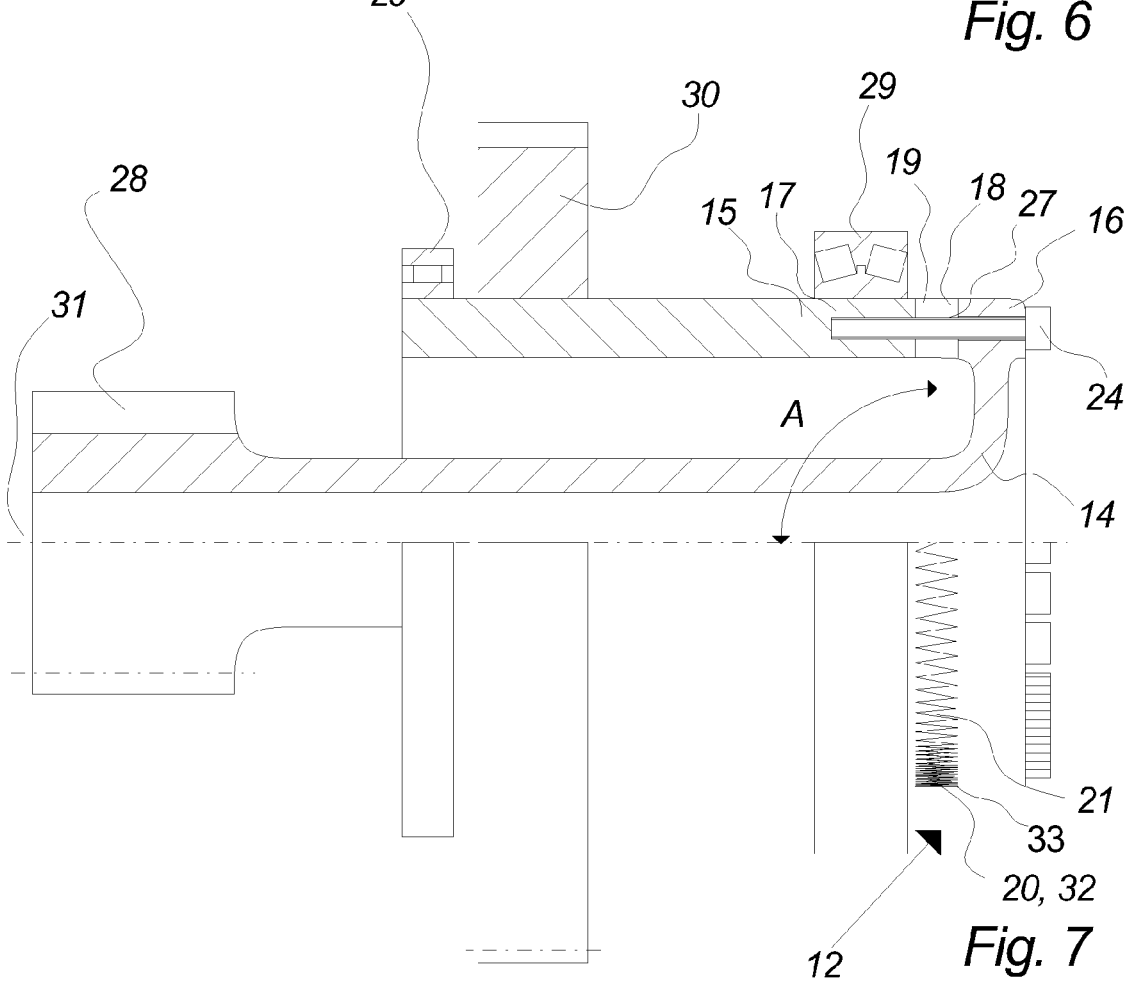
FIG. 7 illustrates a partial cross section of a sun gear, as seen from the side.

By making the inner diameter of the coupling area 18 bigger than the outer diameter of the gear wheel it is enabled that the gear wheel can be dismounted through the second coupling part 17 as illustrated in FIG. 7. By providing the gear wheel with a relatively long and thin-walled shaft it is ensured that the gear wheel can flex a little radial in relation to the coupling area 18 both transversely and regarding parallelism with the axis of rotation 31 of the coupling area 18. This is advantageous in that it hereby is possible to compensate for any temporary or permanent misalignment in the gearbox substantially without affecting the gear wheel and couplings 12 ability to transfer torque.

FIG. 7 illustrates a partial cross section of a sun gear 28, as seen from the side.

In this embodiment of the invention the gear wheel illustrated in FIG. 6 is used as a sun wheel 28 in the planetary stage of a wind turbine gearbox 6. Through the gear wheel shaft and first coupling area 18 the torque generated by the planet gears (not shown) meshing with the sun gear 28 is transferred to a second coupling area 19 of a second coupling part 19 on a second drive train component 15 in the form of a hub of a gear 30 of a gear transmission stage of the wind turbine gearbox 6.

Two bearings 29 substantially ensures the alignment of the second drive train component 15 and the coupling 12 while the long sun gear shaft ensures some flexibility of the sun gear 28 radial.

In this embodiment the coupling areas 18, 19 is fixated in a engaging position by means of a large number of bolts 24 fitted from the back side of the coupling 12 in relation to the sun gear 28, hereby allowing for simple dismantling of the coupling 12 and the sun gear 28.

Particularly when the sun gear 28 or planet gear are a helical gear the thrust is proportional to torque and if the helix angle is chosen such that it "pulls" the faces of the coupling areas 18, 19 into engagement, then this thrust increases the axial pre-load proportional to the torque transfer needs.

Load in axial direction is decisive for load carrying capacity in respect to torque and radial loads. Axial load may be achieved by either operating loads, or static pre-load, e.g. bolts. It may be advantageous for the load carrying capacity of the coupling 12 to apply higher than normal axial loads during the assembly for settling roughness peaks, and increase load sharing between the teeth, essentially by local yielding of some protruding teeth. Very high static pre-load is further advantageous to reduce the impact of tooth accuracy variation, especially tooth spacing tolerances or other.

Furthermore, one of both of the first and second coupling area 18, 19 surfaces may be hardened by tempering or the surfaces may in other ways be treated or coated to avoid/reduce the risk of fretting corrosion, tribo-corrosion and other.

FIG. 8 illustrates a cross section of a coupling 12 comprising angled coupling areas 18, 19, as seen from the side.

In this embodiment of the invention the coupling 12 comprise a first coupling part 16 which is formed integrally in a first drive train component 14 which in this embodiment is the output shaft of a brake system 7 and the coupling 12 comprise a second coupling part 17 which is formed integrally in a second drive train component 15 which in this embodiment is the input shaft of a wind turbine generator 8.

In this embodiment of the invention the coupling 12 comprise axial means 21 in that the coupling areas 18, 19 are established in a face angle A of 45° hereby enabling that the coupling areas 18, 19 can transfer axial loads through the coupling 12.

Furthermore, by arranging the coupling areas 18, 19 in a face angle A of 45° it is furthermore ensured that coupling parts 16, 17 becomes even further self-aligning due to the coning shape of the areas 18, 19.

In this embodiment the fixation means 24 are disposed perpendicular to the coupling areas 18, 19 by in another embodiment the fixation means 24 could be established parallel with the axis of rotation 31 of the coupling 12 or in another direction depending on e.g. the specific coupling design or other.

FIGS. 9A, 9B and 9C illustrates a cross section of three different embodiments of corresponding positive engaging structure 20, 32, as seen from the side.

It is evident for the skilled person that the first positive engaging structure 20 of the first coupling area 18 and the corresponding second positive engaging structure 32 of the second coupling area 19 can be formed in a multitude of ways.

FIGS. 9A, 9B and 9C therefore only illustrates three embodiments of teeth extending radially inwards from the outer periphery 33 towards the centre of the coupling 12 making the size of the teeth increase as the diameter increases but in another embodiment the shape of the teeth could be uniform throughout the coupling areas 18, 19.

The embodiment illustrated in FIG. 9A illustrates that the teeth 20, 32 are formed substantially as ordinary gear teeth. These teeth are formed so there is no tip/root interference enabling that the torque is transferred through the flanks of the teeth. This teeth 20, 32 configuration enables flank centering and is the preferred embodiment in most applications with reversing torque i.e. in wind turbines 1.

Furthermore the embodiment illustrated in FIG. 9A enables a very wide root of the individual teeth which is advantageous in that the shape of tooth root is decisive for load carrying capacity of the teeth.

FIG. 9B illustrates an embodiment where the teeth 20, 32 are formed as formed by alternating square bulges 22 and square recesses 23. To enable assembly of this coupling configuration there would have to be some play between the teeth for which reason this teeth design is not particularly advantageous for varying and reversing loads as presented in a wind turbine 1.

The teeth configuration presented in FIGS. 9A and 9B entails that the first positive engaging structure 20 of the first coupling area 18 is a displaced replica of the corresponding second positive engaging structure 32 of the second coupling area 19. However it is also feasible that the positive engaging structure 20, 32 of the two coupling areas 18, 19 corresponds without the two being alike.

In FIG. 9C is illustrated an embodiment where positive engaging structures 20, 32 of the two coupling areas 18, 19 are different. The corresponding convex and concave flanks could e.g. be advantageous for specific self-centering, self-aligning or torque transferring purposes.

The invention has been exemplified above with reference to specific examples of torque transferring parts 14, 15, couplings 12, positive engaging structures 20, 32 and other. However, it should be understood that the invention is not limited to the particular examples described above but may be designed and altered in a multitude of varieties within the scope of the invention as specified in the claims.

What is claimed is:

1. A wind turbine comprising a drive train, said drive train including at least
    a rotor for transforming wind into rotation of a rotor hub, to provide a drive torque
    a generator for transforming at least a part of said drive torque into electrical power, and
    at least one coupling for connecting a first drive train component to a second drive train component for transferring said drive torque between said components, said coupling comprises a first coupling part with a first coupling area, said first coupling area being connected with a second coupling area of a second coupling part, whereby said drive torque is transferred from one of said areas to the other of said areas during operation of said coupling, wherein
    said first coupling area is provided with a first positive engaging structure engaging a corresponding second positive engaging structure of said second coupling area, and wherein both said first and second positive engaging structures are extending inwardly from positions near or at an outer periphery of the first and second coupling parts, respectively.

2. The wind turbine according to claim 1, wherein said first and second areas comprises an axial load transferring arrangement for transferring axial loads through said coupling at least in one direction.

3. The wind turbine according to claim 2, wherein said axial load transferring arrangement is provided by establishing said areas so that they are non-parallel with an axis of rotation of said coupling.

4. The wind turbine according to claim 2, wherein said areas are established in a face angle of between 45° and 135° in relation to an axis of rotation of said coupling to establish said axial load transferring arrangement.

5. The wind turbine according to claim 1, wherein said first and second positive engaging structure of said first and second coupling areas respectively are formed by alternating bulges and recesses.

6. The wind turbine according to claim 1, wherein said first and second positive engaging structure of said first and second coupling areas respectively are formed as meshing substantially radial extending teeth.

7. The wind turbine according to claim 1, wherein at least one of said first positive engaging structure of said first coupling area and said second positive engaging structure of said second coupling area is formed integrally in said areas.

8. The wind turbine according to claim 1, wherein said first coupling part or said second coupling part is formed integrally in said first drive train component and said second drive train component.

9. The wind turbine according to claim 1, wherein at least one of said first drive train component and said second drive train component is selected from a group consisting of: a drive train shaft, a main shaft, a main bearing, a coupling, a brake, a gearbox, a rotor hub and a generator.

10. The wind turbine according to claim 9, wherein said first drive train component or said second drive train component is a rotating shaft of said wind turbine gearbox.

11. The wind turbine according to claim 10, wherein said first or second coupling area of said rotating shaft defines an outer periphery of said drive train component.

12. The wind turbine according claim 1, wherein said first coupling area and said second coupling area comprise fixators for substantially maintaining at least an axial position of said first coupling area in relation to said second coupling area at least during operation of said coupling.

13. The wind turbine according claim 12, wherein said fixators are mechanical fixation arrangements.

14. The wind turbine according to claim 1, wherein at least one of said first drive train component an said second drive train component is hollow.

15. The wind turbine according to claim 1, wherein said coupling further comprise a radial load transferer for transferring at least a part of a radial load between said first coupling part and said second coupling part, for mutually aligning said first coupling part and said second coupling part, or for both transferring at least a part of a radial load between said first coupling part and said second coupling part and mutually aligning said first coupling part and said coupling part.

16. The wind turbine according to claim 1, wherein said coupling is at least one of self-centering and self-aligning because said first and second positive engaging structures are extending inwardly from positions near or at an outer periphery of the first and second coupling parts, respectively.

17. The wind turbine according to claim 1, wherein said second coupling area of said second drive train component comprises a centre aperture through which said first drive train component can be mounted and dismantled.

18. A method for coupling a first drive train component of the drive train of a wind turbine to a second drive train component of said drive train, said method comprising the steps of
    providing said first drive train component with a first coupling part including a first coupling area and providing said second drive train component with a second coupling part including a second coupling area, and
    joining said first coupling part with said second coupling part by engaging a first positive engaging structure of said first coupling area with a corresponding second positive engaging structure of said second coupling area and so that said first coupling area and said second coupling area are capable of transferring axial loads through said coupling at least in one direction.

19. The method according to claim 18, wherein said method is a method for coupling drive train components in a wind turbine comprising a drive train, said drive train including at least
    a rotor for transforming wind into rotation of a rotor hub, to provide a drive torque
    a generator for transforming at least a part of said drive torque into electrical power, and
    at least one coupling for connecting a first drive train component to a second drive train component for transferring said drive torque between said components, said coupling comprises a first coupling part with a first coupling area, said first coupling area being connected with a second coupling area of a second coupling part, whereby said drive torque is transferred from one of said areas to the other of said areas during operation of said coupling, wherein said first coupling area is provided with a first positive engaging structure engaging a corresponding second positive engaging structure of said second coupling area, and wherein both said first and second positive engaging structures are extending inwardly from positions near or at an outer periphery of the first and second coupling parts, respectively.

20. Use of a wind turbine according to claim 1, wherein said wind turbine is a Megawatt wind turbine.

* * * * *

UNITED STATES PATENT AND TRADEMARK OFFICE
CERTIFICATE OF CORRECTION

PATENT NO.         : 7,936,080 B2
APPLICATION NO.    : 12/766404
DATED              : May 3, 2011
INVENTOR(S)        : Anton Bech et al.

It is certified that error appears in the above-identified patent and that said Letters Patent is hereby corrected as shown below:

In the Specification:

At column 2, line approx. 31, "turbine is particularly", should read -- turbine are particularly --.

At column 2, line approx. 44-45, "areas comprises", should read -- areas comprise --.

At column 3, line approx. 8-9, "transferred trough", should read -- transferred through --.

At column 3, line approx. 43, "are formed as", should read -- is formed as --.

At column 3, line approx. 48, "teeth extends radial", should read -- teeth extend radially --.

At column 4, line 1, "parts has to", should read -- parts have to --.

At column 4, line approx. 67, "more flexible radial", should read -- more flexible radially --.

At column 5, line approx. 10, "further comprise", should read -- further comprises --.

At column 6, line approx. 8, "couplings becomes", should read -- couplings become --.

At column 6, line approx. 32, "seen in from the", should read -- seen from the --.

At column 6, line approx. 39, "FIGS. 9A, 9B and 9C illustrates", should read -- FIGS. 9A, 9B and 9C illustrate --.

At column 6, line approx. 48, "coupling 12 comprise", should read -- coupling 12 comprises --.

At column 6, line approx. 50-51, "is the a shaft", should read -- is a shaft --.

At column 6, line approx. 53, "coupling 12 comprise", should read -- coupling 12 comprises --.

At column 7, line 1, "invention are used", should read -- invention is used --.

At column 7, line approx. 10-11, "parts 16, 17 was", should read -- parts 16, 17 were --.

At column 7, line approx. 14-15, "part 16 comprise", should read -- part 16 comprises --.

Signed and Sealed this
Thirteenth Day of March, 2012

David J. Kappos
*Director of the United States Patent and Trademark Office*

CERTIFICATE OF CORRECTION (continued)
U.S. Pat. No. 7,936,080 B2

At column 7, line approx. 16-17, "part 17 comprise", should read -- part 17 comprises --.

At column 7, line approx. 22, "areas 18, 19 was", should read -- areas 18, 19 were --.

At column 7, line approx. 25, "area 18 comprise", should read -- area 18 comprises --.

At column 7, line approx. 28, "area 18 comprise", should read -- area 18 comprises --.

At column 7, line approx. 36-37, "coupling 12 comprise", should read -- coupling 12 comprises --.

At column 7, line approx. 40, "18, 19 are 90°", should read -- 18, 19 is 90° --.

At column 7, line approx. 43-44, "further comprise", should read -- further comprises --.

At column 7, line approx. 54, "or non of the", should read -- or one of the --.

At column 7, line approx. 66, "further comprise", should read -- further comprises --.

At column 8, line approx. 42, "disengaged. In that", should read -- disengaged. --.

At column 8, line approx. 55, "amount if displacement", should read -- amount of displacement --.

At column 8, line approx. 59, "seen in from", should read -- seen from --.

At column 8, line approx. 61, "by radial extending", should read -- by radially extending --.

At column 8, line approx. 64-65, "that at the", should read -- than at the --.

At column 9, line approx. 11, "areas 18, 19 was", should read -- areas 18, 19 were --.

At column 9, line approx. 33, "a little radial in", should read -- a little radially in --.

At column 9, line approx. 50, "ensures the", should read -- ensure the --.

At column 9, line approx. 54, "areas 18, 19 is", should read -- areas 18, 19 are --.

At column 10, line approx. 7, "one of both", should read -- one or both --.

At column 10, line approx. 14-15, "coupling 12 comprise", should read -- coupling 12 comprises --.

At column 10, line approx. 17, "coupling 12 comprise", should read -- coupling 12 comprises --.

At column 10, line approx. 22, "coupling 12 comprise", should read -- coupling 12 comprises --.

At column 10, line approx. 29, "parts 16, 17 becomes", should read -- parts 16, 17 become --.

At column 10, line approx. 32, "by in another", should read -- but in another --.

At column 10, line approx. 37, "FIGS. 91, 9B and 9C illustrates", should read -- FIGS. 9A, 9B and 9C illustrate --.

At column 10, line approx. 44, "only illustrates", should read -- only illustrate --.

At column 10, line approx. 61-62, "are formed as formed by", should read -- are formed by --.

CERTIFICATE OF CORRECTION (continued)

U.S. Pat. No. 7,936,080 B2

In the Claims:

At column 11, claim number 2, line 44, "areas comprises", should read -- areas comprise --.

At column 11, claim number 6, line 62, "radial extending teeth", should read -- radially extending teeth --.

At column 12, claim number 14, line 24, "component an said", should read -- component and said --.

At column 12, claim number 15, line 27, "coupling further comprise", should read -- coupling further comprises --.

At column 12, claim number 15, line 33, "said coupling part", should read -- said second coupling part --.